April 16, 1963  A. H. LEFEBVRE ET AL  3,085,401
REHEAT COMBUSTION EQUIPMENT OF GAS-TURBINE ENGINES
Filed Dec. 7, 1959
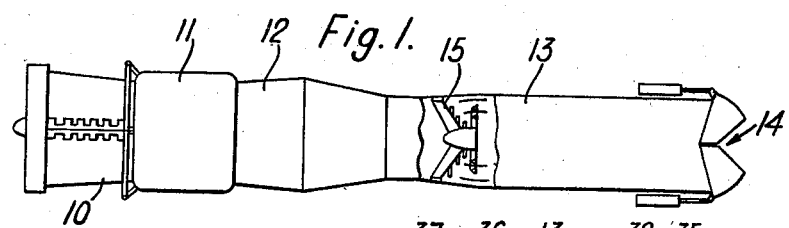
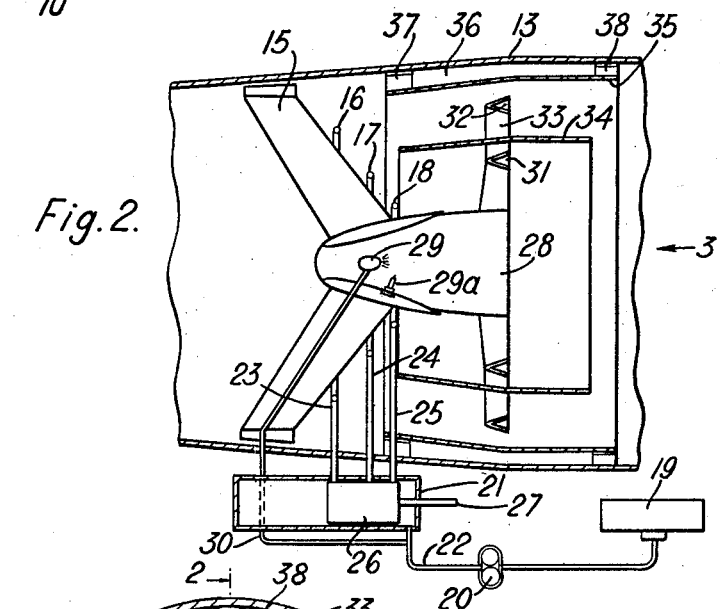
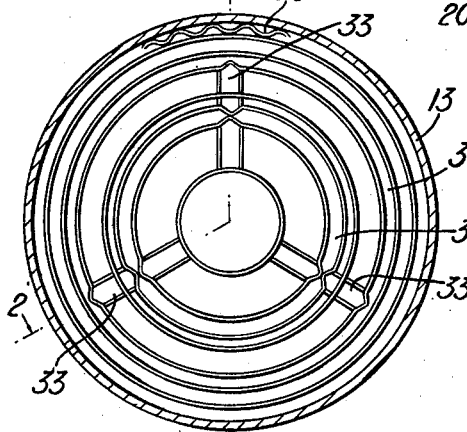
Arthur Henry Lefebvre, &
Robert Arthur Rice
Inventors
By
Fred L. Witherspoon, Jr., &
Fred. E. Shoemaker  Attorneys United States Patent Office
3,085,401
Patented Apr. 16, 1963

3,085,401
REHEAT COMBUSTION EQUIPMENT OF GAS-TURBINE ENGINES
Arthur Henry Lefebvre, Mackworth, Derby, and Robert Arthur Rice, Burton-upon-Trent, England, assignors to Rolls-Royce Limited, Derby, England, a company of Great Britain
Filed Dec. 7, 1959, Ser. No. 857,772
Claims priority, application Great Britain Jan. 22, 1959
3 Claims. (Cl. 60—39.72)

This invention comprises improvements in or relating to reheat combustion equipment of gas-turbine engines.

If a high thrust boost is to be obtained from the reheat combustion equipment of a gas-turbine jet propulsion engine, a considerable quantity of the air forming part of the jet gases will be required to support combustion of the reheat fuel. It is therefore important to arrange that all the remaining limited supply of air is accurately directed onto the inner wall of the jet pipe so as to assist in cooling it. It must, however, be ensured that this cooling air, which by-passes the burning zone in which combustion of the reheat fuel occurs, does not entrain with it any appreciable amount of reheat fuel since such fuel will be passed to atmosphere unburnt with consequent loss of efficiency. It is therefore an object of the invention to provide reheat combustion equipment which shall be satisfactory in this respect.

Another object of the invention is to reduce the hazard of combustion within the air whose primary purpose is for cooling.

According therefore to the invention in its broadest aspect there is provided reheat combustion equipment for a gas-turbine engine, said equipment comprising injector means for injecting reheat fuel into the hot gases exhausted from the turbine or from a stage thereof, means for effecting combustion of the injected reheat fuel in a burning zone spaced from and downstream of the injector means, and means for radially confining the flow of the reheat fuel which has been injected into the hot gases so as to direct substantially the whole of the injected reheat fuel into the burning zone.

In its preferred form the invention comprises a gas-turbine jet-propulsion engine comprising injector means for injecting reheat fuel into the jet pipe of the engine so as to be entrained in the jet gases flowing therethrough, means for effecting combustion of the injected reheat fuel in a burning zone spaced from and downstream of the injector means, and means for radially confining the flow of the reheat fuel which has been injected into the hot gases so as to direct substantially the whole of the injected reheat fuel into the burning zone.

The means for radially confining the flow of the reheat fuel preferably comprises a tubular shield mounted within the jet pipe with an annular clearance therebetween, the shield being so disposed with respect to the injector means that substantially all the reheat fuel injected therefrom passes through the shield. Thus the upstream end of the shield may be disposed in the same transverse plane as or immediately downstream of the injector means.

Preferably means are provided for preventing the entrainment of all the boundary layer flow into the said annular clearance. The said means are preferably disposed at the upstream end of the shield and said means may comprise a corrugated member which directs part of the boundary layer flow to the inside of the shield for combustion and part of it to the outside of said shield for cooling.

The said corrugated member may form part of the shield or be separated therefrom but carried thereby.

Combustion stabilising means are preferably mounted within said shield and the said shield preferably extends downstream of the combustion stabilising means so as to direct substantially the whole of the reheat fuel into the flames originating from the stabilising means. The said downstream extension of the shield may also serve to shield the jet pipe from the heat produced in the burning zone.

The portion of the shield extending downstream of the combustion stabilising means may be corrugated and/or perforated so as to suppress reheat howl, that is to say the howl caused by high frequency pressure fluctuations in the burning zone.

Alternatively the perforations may be replaced by longitudinal slots or by radial vanes mounted from the shield or jet pipe or both.

The volume within the shield which is open to fuel flow therethrough may be so selected in relation to the fuel output of its injector means that the fuel/air ratio of the gases supplied to the burning zone is maintained at or near the stoichiometric value.

There may be a plurality of injector means, control means being provided for supplying reheat fuel at will either to all or to a selected number of the injector means.

There may also be a plurality of tubular shields each of which has injector means associated therewith. Such a plurality of shields are preferably mounted within each other.

The invention is illustrated, merely by way of example, in the accompanying drawings in which:

FIGURE 1 is a schematic representation of a gas-turbine jet-propulsion engine according to the invention, FIGURE 2 is a section, taken on the line 2—2 of FIGURE 3, through a part of the engine shown in FIGURE 1, and FIGURE 3 is a cross section looking in the direction of the arrow 3 of FIGURE 2.

Referring first to FIGURE 1, a gas-turbine jet-propulsion engine comprises the usual compressor 10, combustion equipment 11, and turbine 12, the hot gases exhausted from the turbine 12 passing through a jet pipe 13 provided with a variable-area propelling nozzle 14.

Within the jet pipe 13 there is mounted a spider 15 which supports three ring manifolds 16, 17, 18 (see FIGURE 2) each of which is provided with a series of holes (not shown) to permit injection of reheat fuel. The ring manifolds 16, 17, 18 are arranged successively downstream of each other and are of successively reduced diameter.

Reheat fuel from a tank 19 is pumped by a fuel pump 20 into a cylinder 21 via a pipe 22. Pipes 23, 24, 25 communicate respectively with the ring manifolds 16, 17, 18 and with axially spaced ports in the cylinder 21. A piston valve 26, having a piston rod 27 which may be moved by any convenient means (e.g. by means manually operable from the pilot's cabin) is movable in the cylinder 21 so as successively to cover and uncover the said axially spaced ports. When the piston valve 26 is set in the position shown in FIGURE 2, reheat fuel is, of course, prevented from reaching any of the ring manifolds. As, however, the piston valve 26 is gradually moved towards the left, as seen in FIGURE 2, first the ring manifold 18 only, and then the ring manifolds 17, 18 and finally all three ring manifolds will be supplied with fuel.

The spider 15 also supports an approximately conical hollow baffle 28 which is disposed centrally of the jet pipe 13 with its concavity facing downstream. Mounted within the baffle 28 is a spray nozzle 29 which is adapted to be supplied with reheat fuel from the pipe 22 by way of a pipe 30. It will be noted that the flow of reheat fuel through the pipe 30 is not controlled by the piston valve 26. The arrangement is therefore such that, provided the pump 20 is in operation, fuel will be supplied to the nozzle 29. This fuel may, at starting, be ignited by an H.T. igniter 29a, the baffle 28 producing in the jet stream a recirculatory zone in which combustion of the fuel provided by the nozzle 29 can occur. Thus the nozzle 29 may act as a pilot for the ignition of the reheat fuel which is injected into the jet stream through the fuel jets in the ring manifolds 16–18.

Mounted about the downstream end of the baffle 28 are two concentric annular gutters 31, 32 which are interconnected by three radially extending gutters 33. Each of the gutters 31–33 has a V-section trough, the said gutters serving to stabilise combustion of the reheat fuel supplied from the ring manifolds 16–18.

The stabilising gutters 31, 32 are respectively mounted within tubular shields 34, 35, the shield 34 being mounted concentrically within the shield 35. The shields 34, 35 have their upstream ends disposed immediately downstream of the ring manifolds 16–18. Reheat fuel injected into the jet gases from the ring manifolds 17, 18 is confined to the zone inside the shield 34 and becomes ignited at or immediately downstream of the gutter 31. The arrangement is thus such that the shield 34 radially confines the flow of reheat fuel from the ring manifolds 17, 18 and directs said flow to the burning zone originating from the gutter 31 and the central baffle 28 so as to ensure that substantially the whole of this fuel is burnt therein. Similarly the shield 35 serves radially to confine the flow of reheat fuel from the ring manifold 16 so as to ensure that substantially the whole of this fuel is burnt in the burning zone originating from the gutter 32.

The volume of the space within the shield 34 which is open to fuel flow is so selected in relation to the combined fuel output of the ring manifolds 17, 18, and the volume of the space between the shield 34, 35 which is open to fuel flow is so selected in relation to the fuel output of the ring manifold 16 that the fuel/air ratio at the burning zones is maintained at or near the stoichiometric value over the desired operating range.

The shield 35 is spaced from the jet pipe 13 by an annular clearance 36. The shield 35 is held in this spaced relationship by corrugated strips 37, 38 which are disposed in the annular clearance at the upstream and downstream ends respectively of the shield 35. The strips 37, 38 may be integral with the shield 35 or may be separate members secured thereto.

The arrangement is such that jet gases from the turbine 12 flow through the annular clearance 36 and since the temperature of these gases is substantially lower than that of the burning zones within the shields 34, 35 the jet gases serve to cool the jet pipe 13. The portion of the shield 35 which extends downstream of the gutter 32 also performs a heat-shielding function inasmuch as it prevents the flame from the said burning zones from being directed onto the jet pipe.

The corrugated strips 37 and 38 are provided to assist in supporting the shield 35 from the jet pipe 13.

The portion of the shield 35 which extends downstream of the gutter 32 may be corrugated and/or perforated to assist in suppressing reheat howl, that is to say the howl caused by high frequency pressure fluctuations in the burning zone.

In operation, when low thrust boost is required the piston valve 26 is positioned so that reheat fuel is supplied to one or both of the ring manifolds 17, 18 but not to the ring manifold 16. By this means variable reheat over a given temperature range can be provided. It will be appreciated that at this stage burning will be confined inside the shield 34. When, however, maximum thrust is required, the piston valve 26 is positioned so that reheat fuel is supplied to all three ring manifolds 16–18 whereby a maximum reheat temperature may be achieved. When this occurs there will of course be burning within both shields. Thus the effective size of the region in which the reheat fuel is burnt varies according to whether all or only some of the ring manifolds are supplied with fuel. The shields 34, 35 will confine the flow of fuel to the space inside the shields so that substantially no fuel will be wasted by passing to atmosphere without passing through one or both burning zones.

We claim:

1. The combination with a gas turbine engine delivering jet gases containing combustion air and a jet pipe on said engine for delivering said gases, of a plurality of tubular coaxial shields mounted in the jet pipe, one within the other, said tubular shields having open upstream ends which are substantially co-terminous, and open downstream ends which are substantially co-terminous, said shields defining immediately successive spaces which are radially separated by said shields, a plurality of liquid fuel injector means each of which is so disposed upstream of said shields and directed so as to supply fuel to a respective one of said spaces only, said injector means being adapted to supply fuel to said spaces so that there is a substantially stoichiometric relationship between the combustion air and fuel flowing through each said space and independent of the others, and a combustion stabilizing means mounted in each of said spaces and intermediate said upstream and downstream ends of said shields, each combustion stabilizing means being arranged sufficiently downstream of the respective injector means that the injected fuel and the combustion air form an intimate mixture before they impinge on the combustion stabilizing means.

2. The combination with a gas turbine engine delivering jet gases containing combustion air and a jet pipe on said engine for delivering said gases, of a plurality of tubular coaxial shields mounted in the jet pipe, one within the other, said tubular shields having open upstream ends which are substantially co-terminous, and open downstream ends which are substantially co-terminous, said shields defining spaces which are radially separated by said shields, a plurality of liquid fuel injector means each of which is so disposed upstream of said shields as to supply fuel to a respective one of said spaces, each injector means being adapted to supply fuel to one only of said spaces so that there is a substantially stoichiometric relationship between the combustion air and fuel flowing through each said space, a combustion stabilizing means mounted in each of said spaces and intermediate said upstream and downstream ends of said shields, each combustion stabilizing means being arranged sufficiently downstream of the respective injector means that the injected fuel and the combustion air form an intimate mixture before they impinge on the combustion stabilizing means, and means for variably selecting the number of said injector means to which liquid fuel is supplied.

3. The combination claimed in claim 1 wherein the outermost tubular shield is coaxial with the jet pipe and spaced therefrom by an annular clearance having an open upstream end for the entrance of jet gases and air for cooling the jet pipe, and an open downstream end for exit of said gases and air into the jet pipe.

References Cited in the file of this patent

UNITED STATES PATENTS

| | | |
|---|---|---|
| 2,508,420 | Redding | May 23, 1950 |
| 2,637,972 | Laucher | May 12, 1953 |
| 2,704,435 | Allen | Mar. 22, 1955 |
| 2,705,869 | Johnstone | Apr. 12, 1955 |
| 2,760,339 | Jurisich | Aug. 28, 1956 |

FOREIGN PATENTS

| | | |
|---|---|---|
| 204,422 | Australia | Nov. 23, 1956 |
| 803,813 | Great Britain | Nov. 5, 1958 |